United States Patent [19]
Black, Jr. et al.

[11] Patent Number: 5,806,856
[45] Date of Patent: *Sep. 15, 1998

[54] ON-SITE FILLABLE LIQUID MAGNETIC SEAL

[75] Inventors: Thomas J. Black, Jr., Merrimack; William B. Mraz, Newfield, both of N.H.

[73] Assignee: Ferrofluidics Corporation, Nashua, N.H.

[*] Notice: The term of this patent shall not extend beyond the expiration date of Pat. No. 5,424,302.

[21] Appl. No.: 752,815

[22] Filed: Nov. 21, 1996

Related U.S. Application Data

[63] Continuation-in-part of Ser. No. 724,193, Oct. 1, 1996, abandoned, which is a continuation of Ser. No. 479,657, Jun. 7, 1995, Pat. No. 5,560,620, which is a continuation of Ser. No. 936,858, Aug. 27, 1992, Pat. No. 5,474,302.

[51] Int. Cl.$^6$ ..................................................... F16J 15/53
[52] U.S. Cl. .................................................. 277/1; 277/80
[58] Field of Search .................................. 277/1, 72 FM, 277/80, 135

[56] References Cited

U.S. PATENT DOCUMENTS

| | | |
|---|---|---|
| 1,844,903 | 2/1932 | Queen . |
| 3,572,855 | 3/1971 | Weichsel . |

(List continued on next page.)

FOREIGN PATENT DOCUMENTS

| | | |
|---|---|---|
| 267656 | 11/1963 | Australia . |
| 45-41175 | 7/1966 | Japan . |

(List continued on next page.)

OTHER PUBLICATIONS

J. Gerrema, Gallium–Based Liquid–Metal Full–Film Lubricated Journal Bearings, Asle Transactions, vol. 28, pp. 47–53.

A.V. Ivanov et al., Wetting and Infiltration of Porous Tungsten and Molybdenum by Liquid Gallium, Institute of Materials Science, vol. 6(258), pp. 56–58, Jun., 1984.

John C. Berg, Wettability, Library of Congress Cataloging-in–Publication Data, vol. 49, iii–vii, pp. 2–13, 1993.

Primary Examiner—Scott Cummings
Attorney, Agent, or Firm—Kudirka & Jobse, LLP

[57] ABSTRACT

An on-site fillable ferrofluidic seal comprises a ferrofluidic seal having at least one ferrofluid conducting channel extending through either the magnet, through one of the pole pieces which sandwich the opposing pole ends of the magnet, or through both the magnet and a pole piece. The conducting channel extends to a location where deposited ferrofluid will be drawn to the gaps between the pole pieces and the shaft. In another embodiment a multi-stage seal is filled by displacing the pole piece/magnet assembly axially relative to the shaft so that each pole piece projection falls halfway axially between two shaft projections. The displacement alters the normal magnetic field pattern to create a substantially uniform magnetic field throughout the pole piece/shaft interface region such that ferrofluid can be drawn through the region. When the shaft is returned to its original position with respect to the pole piece/magnet assembly, that is, when the pole piece projections are re-aligned axially with the shaft projections, a series of stages of the multi-stage hermetic "O-ring" seal are created. An alternative embodiment of the invention uses the capillary action of the liquid to maintain a multistage seal which holds the liquid in place using axially aligned wettable and non-wettable surfaces on a shaft and stator surrounding the shaft. With the wettable surfaces of the shaft axially aligned with those of the stator, the liquid congregates in the gaps formed between the wettable surfaces of the shaft and stator. Filling of the seal is accomplished by displacing the shaft relative to the stator such that each wettable surface on the shaft axially overlaps two wettable surfaces on the stator, thus providing a path of wettable surfaces which allow the liquid to flow along the length of the seal.

20 Claims, 14 Drawing Sheets

U.S. PATENT DOCUMENTS

| | | |
|---|---|---|
| 3,740,060 | 6/1973 | Miskolczy et al. . |
| 3,814,443 | 6/1974 | Steigerwald . |
| 3,880,434 | 4/1975 | Echard et al. ............................ 277/65 |
| 4,054,293 | 10/1977 | Hoeg et al. . |
| 4,171,818 | 10/1979 | Moskowitz et al. . |
| 4,205,767 | 6/1980 | Shackelford . |
| 4,210,371 | 7/1980 | Gerkema et al. . |
| 4,252,328 | 2/1981 | Raj et al. . |
| 4,252,353 | 2/1981 | Raj et al. . |
| 4,380,356 | 4/1983 | Weghaupt . |
| 4,424,974 | 1/1984 | Mitsuya et al. . |
| 4,475,735 | 10/1984 | Smuda et al. . |
| 4,506,895 | 3/1985 | Raj . |
| 4,527,802 | 7/1985 | Wilcock et al. . |
| 4,645,096 | 2/1987 | Grant . |
| 4,671,677 | 6/1987 | Heshmat et al. . |
| 4,671,679 | 6/1987 | Heshmat . |
| 4,694,213 | 9/1987 | Gowda et al. . |
| 4,772,031 | 9/1988 | Poppo . |
| 5,092,611 | 3/1992 | Ehmsen et al. . |
| 5,181,235 | 1/1993 | Ono et al. . |
| 5,474,302 | 12/1995 | Black, Jr. et al. . |
| 5,560,620 | 10/1996 | Black, Jr. et al. . |

FOREIGN PATENT DOCUMENTS

| | | |
|---|---|---|
| 55-51124 | 4/1980 | Japan . |
| 55-78862 | 6/1980 | Japan . |
| 55-86962 | 7/1980 | Japan . |
| 58-65373 | 4/1983 | Japan . |
| 58-187658 | 11/1983 | Japan . |
| 59-23167 | 2/1984 | Japan . |
| 59-58271 | 4/1984 | Japan . |
| 60-40871 | 3/1985 | Japan . |
| 60-155066 | 8/1985 | Japan . |
| 61-215864 | 9/1986 | Japan . |
| 61-266875 | 11/1986 | Japan . |
| 62-72966 | 4/1987 | Japan . |
| 62-177366 | 8/1987 | Japan . |
| 62-177367 | 8/1987 | Japan . |
| 62-177368 | 8/1987 | Japan . |
| 806864 | 2/1981 | U.S.S.R. . |
| 1314166 | 5/1987 | U.S.S.R. . |
| 1364811 | 1/1988 | U.S.S.R. . |
| 1548566 | 3/1990 | U.S.S.R. ................................ 277/135 |
| 783881 | 10/1957 | United Kingdom . |
| WO 8303453 | 10/1983 | WIPO . |

ON-SITE FILLABLE LIQUID MAGNETIC SEAL

CROSS REFERENCE TO RELATED APPLICATIONS

This application is a continuation-in-part of U.S. patent application Ser. No. 08/724,193, filed Oct. 1, 1996 now abandoned which is a continuation of U.S. patent application Ser. No. 08/479,657, filed Jun. 7, 1995 now issued as U.S. Pat. No. 5,560,620, which, in turn, is a continuation of U.S. patent application Ser. No. 07/936,858, filed Aug. 27, 1992 and now issued as U.S. Pat. No. 5,474,302.

FIELD OF THE INVENTION

This invention relates to liquid seals and, more particularly, to rotary liquid seals which are capable of being filled and/or refilled with liquid while assembled and while in use.

BACKGROUND OF THE INVENTION

Ferrofluid seals are customarily used to provide a hermetic seal between a rotating shaft and a stationary housing or other assembly. Ferrofluidic seals may also be installed to provide an airtight seal between a stationary shaft and a rotating housing, or between any component which is in stationary or rotational relation with another component. Ferrofluidic seals may be used for a variety of purposes, such as excluding contaminants, containment of valuable or toxic gases, or supporting a pressure difference between a contained volume and its surroundings. For example, such seals are commonly used in computer magnetic disk storage units to prevent the entry of particles into the disk area.

A conventional two-stage ferrofluidic seal comprises an axially-polarized, annular magnet whose opposing pole ends are sandwiched by a pair of annular magnetically-permeable pole pieces, all of which are designed to fit over a shaft, creating narrow annular gaps between each pole piece and the shaft. The annular magnet provides a magnetic flux path which extends through one pole piece, across a gap to the shaft, through the shaft, back from the shaft across a gap and through the other pole piece. The magnetic flux path concentrates a strong magnetic field in each gap, which retains ferrofluid applied to the conventional seal in the annular gaps located between the shaft and the pole pieces, creating seal-tight liquid hermetic O-rings therein.

The ferrofluidic seal may be engineered in terms of the relative size and shape of seal components and overall seal configuration to achieve specific performance characteristics. For example, the inner radius, width and geometric configuration of each pole piece, the radius of the annular magnet relative to the radius of a pole piece or pole pieces, the number of pole pieces and magnets employed, etc. may be varied to create seals which selectively retain ferrofluid in one or more gaps, which create a specific magnetic flux pattern across one or more annular gaps, which are "splash-controlled", which exhibit exceptional longevity under harsh conditions, which withstand substantial pressure differentials, etc. The two-stage seal described above may be designed so as to retain ferrofluid in one annular gap only, creating a single-stage seal, or a single-stage seal may be constructed of an annular magnet and one pole piece only.

Additionally, a "multi-stage" ferrofluidic seal may be constructed comprising a magnet sandwiched by a pair of pole pieces, each pole piece having a plurality of inwardly-facing annular projections on its inner periphery. Alternatively, the shaft may have a plurality of outwardly-facing projections on its outer periphery. In the first case, when the pole piece/magnet assembly is mounted about the shaft the pole-piece projections come into close proximity with the outer periphery of the shaft forming a plurality of annular gaps, and in the alternate case the shaft projections come into close proximity with the inner periphery of the pole piece(s) forming the gaps. In either case, each gap into which ferrofluid is introduced and in which it is retained comprises a "stage" of the multi-stage seal. In a less common arrangement, a multi-stage seal may comprise a series of discrete pole piece(s)/magnet couples.

There are several methods of applying ferrofluid to one or both of the annular gaps in a two-stage seal. If the inner radii of the pole pieces are less than the radius of the magnet, the magnet and the pole pieces define an inner annular cavity. In one method in which a "self-activating" ferrofluid seal is created, ferrofluid is applied to the cavity prior to the installation of the seal over a magnetically-permeable shaft. According to this method, the pole pieces and magnet are constructed and arranged such that in the absence of a shaft, the magnetic flux path is most concentrated within the cavity, and in the presence of a magnetically-permeable shaft the flux path is most concentrated in the resultant annular gaps. Thus, ferrofluid is retained in the cavity until the pole piece/magnet assembly is installed about the shaft, whereupon the original magnetic flux path is altered to pass across the gaps between the shaft and the pole pieces and extend through the shaft, instead of across the cavity to the between the pole pieces. Once this magnetic flux path alteration takes place, the applied ferrofluid is quickly drawn into the gaps creating the two-stage seal. U.S. Pat. No. 4,252,353, issued Feb. 24, 1981, and assigned to the same assignee as the present invention, describes this "self-activating" ferrofluidic seal.

In a variation of this method, ferrofluid may be applied to a pair of opposing tabs located in the inner annular cavity of the seal prior to installing the seal on the shaft. Each tab is an extension from one of the pole pieces and serves to enhance magnetic flux at a specific location within the cavity so that ferrofluid is retained there during assembly. When the pole piece/magnet assembly is mounted on the shaft, the magnetic flux path is altered as above, creating a hermetic seal at each gap.

In another method, ferrofluid is applied to the annular gaps after mounting the pole piece/magnet assembly about the magnetically-permeable shaft. According to this method, if both pole pieces are accessible for ferrofluid deposition, a two-stage seal can be easily created. However, as is commonly the case, one pole piece only may be easily addressable. Generally, the larger the radius of the magnet relative to the radii of the pole pieces in such a seal, the sharper the lines of magnetic flux across the gaps between each pole piece and the shaft. In this case, if the pole pieces and magnet are arranged as described above so as to create maximum density of flux in the gaps between the pole pieces and the shaft, ferrofluid applied to the addressable gap will be retained in that gap only, creating a single-stage seal (to reach the other gap ferrofluid would have to pass from a location with a strong magnetic field under the addressed pole piece and across a low magnetic field region to the other gap). In an alternate arrangement, if a relatively narrow magnet is employed such that the separation axially of the pole pieces is relatively small, or if the radii of the magnet and pole pieces are substantially equal, magnetic flux may not be as exclusively concentrated in the pole piece/shaft gaps, but may be more diffuse across the entire pole piece/ magnet/shaft region. According to this arrangement, deposition of ferrofluid at one pole piece/shaft gap will result in the ferrofluid being drawn into the gap, into the inter-pole piece cavity, and into the second pole piece/shaft gap. This arrangement advantageously allows ferrofluid filling of the entire seal from one addressable pole piece/shaft gap only, as well as increased ferrofluid volume in the seal which may increase seal longevity, but generally at the expense of seal strength due to the more diffuse magnetic flux. However, this and previously-described methods require that one or more gaps be accessible for ferrofluid deposition, which often requires time-consuming disassembly and re-assembly of equipment.

There are also a number of methods of applying ferrofluid to some or all of the projections or stages of a multi-stage seal. In one method, the multi-stage seal may be constructed with a temporary non-magnetic spacer located and inserted in place of the magnet during assembly. Ferrofluid is deposited in cavities between the projections in the shaft or pole piece(s) prior to assembly and is retained therein by surface tension. The pole piece/spacer assembly is then installed about the shaft, which installation does not disrupt the ferrofluid distribution, the spacer is removed, and a magnet is inserted in its place. The magnet creates a magnetic field which follows a magnetic circuit containing the pole piece (s), the gaps, and the shaft, and which field draws ferrofluid out of the cavities between the projections and into the gaps, forming a multi-stage ferrofluidic seal.

In another method, the multi-stage seal is assembled as above but with a magnet in an unmagnetized state, rather than with a spacer in place of the magnet. Once assembly is complete the magnet is magnetized by exposing the entire seal assembly to the field of a magnetizer. As in the above case, ferrofluid is then drawn from the cavities into the gaps creating a multi-stage seal.

In another method, a permanent magnet is utilized and ferrofluid is applied to the cavities between projections in the shaft or pole piece(s) and is retained therein by surface tension or by the magnetic flux path as described above with respect to the two-stage seal assembly. When the pole piece/magnet assembly is installed about the shaft, the original magnetic flux path is altered to pass across the gaps between the projections on the pole pieces and the shaft, or between the projections on the shaft and the pole pieces. This magnetic flux path alteration draws the ferrofluid into the gaps creating the multi-stage seal. However, in the case of the multi-stage seal (and to some extent the two-stage seal), the first stages to be "activated", i.e. have the ferrofluid drawn into the gap, are subject to axial friction between the shaft and the pole piece(s) as installation is completed. Thus, the installation process may displace some ferrofluid from the first-activated stages, and it may be necessary to apply excess ferrofluid to ensure adequate seal formation throughout the entire multi-stage (or two-stage) seal.

In still another method, ferrofluid is drawn into the assembled seal by suction or pressure with varying degrees of success.

The methods for creating the single-stage, two-stage, or multi-stage ferrofluidic seals discussed above have several drawbacks. As noted, ferrofluid must be deposited at certain regions in the assembly prior to installation in many cases, and the additional step of magnetization of the assembly may be necessary, requiring specialized equipment and trained personnel. Where such pre-deposition is not required to create satisfactory seals, it may be necessary to address each gap of the assembled apparatus to achieve satisfactory results, limiting or precluding seal formation in some or all gaps once assembly is complete.

Additionally, under certain circumstances such seals may require refilling with ferrofluid. In applications in which a seal is needed to support a low pressure differential, but which may intermittently be exposed to bursts of high pressure, a relatively simple and low-cost conventional ferrofluid seal could be used to withstand the low pressure differential but which may fail after repeated exposure to such high pressure bursts, as each burst may result in net loss of ferrofluid. Refilling may also be advantageous in applications in which a seal is subjected to extremely harsh conditions, thermally or chemically, and it may be advantageous to design a simple means of expelling worn ferrofluid from such seals prior to refilling. After servicing, or otherwise disand re-assembling components sealed by or otherwise in relation with ferrofluidic seals, such refilling may also be necessary.

If ferrofluidic seals need be refilled with ferrofluid, or if it is advantageous to fill the seals after assembly or servicing "on site" rather than at the site of manufacture or assembly, a need exists for easily fillable and refillable ferrofluidic seals.

An example of an application in which refillable ferrofluidic seals would be advantageous follows. It is increasingly important, in oil refinery pumping stations, to contain any volatile fumes which may escape as a result of the leakage of volatile liquids. Typically, volatile liquids leak through mechanical face seals surrounding rotating shafts in pumping stations. It is advantageous to contain the region about the face seal, employing a ferrofluidic seal about the shaft, the contained region being vented to a refinery flare or other disposal means. Generally, the pressure in the flare line is minimal, and a two-stage ferrofluidic seal is ideally employed. However, occasionally the flare line experiences a sudden burst of high pressure, which may cause a two-stage seal to burst. Frequent high-pressure bursts such as these generally cause the seal to fail over time.

It is therefore an object of the present invention to provide a ferrofluid seal apparatus into which ferrofluid can be introduced after the apparatus has been assembled, to provide a ferrofluid seal apparatus which can be refilled with ferrofluid after installing the pole piece/shaft assembly on the shaft, to provide a ferrofluid seal apparatus which apparatus can be refilled with ferrofluid without stopping the shaft rotation or housing and disassembling the system, and to provide a ferrofluid seal which can be utilized in a wider range of applications than prior art seals.

SUMMARY OF THE INVENTION

One illustrative embodiment of the invention comprises a ferrofluidic seal having at least one conducting channel extending through either the magnet, through a pole piece or pole pieces adjacent to opposing pole end(s) of the magnet, or through both the magnet and a pole piece. The conducting channel extends to a location between the pole pieces where deposited ferrofluid will be drawn to the gap or gaps. Thus, the inventive pole piece/magnet assembly can first be installed on a magnetically-permeable shaft before introducing ferrofluid. Once installed, ferrofluid may be applied and/or reapplied to the seal gaps through the channel. The conducting channel is positioned with respect to the magnet and pole pieces such that the magnetic field present in the seal gaps draws deposited ferrofluid to the gaps to form the seals rather than to other portions of the seal assembly such as inter-pole-piece or inter-stage cavities (although it may be advantageous to deposit ferrofluid in a cavity, as noted above, using the method of the present invention). The conducting channel may be lined with a filler tube and may be equipped with a removable plug or cap to close the channel after the deposition of ferrofluid. The tube is designed to deliver ferrofluid to the location where it will be drawn to the gap(s). The plug or cap maintains a desirable pressure differential established between the pole pieces or sealing stages when the seal is pressurized.

In another embodiment of the invention, the on-site fillable ferrofluid seal comprises a multi-stage seal, preferably having at least one conducting channel extending through either the magnet, the pole piece or pole pieces which sandwich the opposing pole ends of the magnet, or through both the magnet and a pole piece or pole pieces. The conducting channel extends to a location where deposited ferrofluid will be drawn to the gaps. Whereas the conventional multi-stage seal described above has a plurality of inwardly facing projections from the inner periphery of the pole piece(s) or has a plurality of outwardly facing projections from the outer periphery of the shaft in order to form a plurality of seal stages, the inventive multi-stage, on-site refillable seal has the aforementioned projections on both the shaft and the pole piece. During normal operation of the inventive multi-stage seal, the projections on the pole piece (s) and shaft are substantially axially aligned with each other so that small seal gaps are formed between the pole piece(s) projections and the shaft projections, and according to this arrangement the magnetic field is strongest in the gaps. During seal filling, the pole piece projections are displaced axially relative to the shaft projections so that the shaft projections fall roughly halfway between the pole-piece projections. Such displacement creates a continuous region of relatively high magnetic field between the shaft projections and the pole piece(s) projections and extending throughout the length of the shaft/pole piece interface, rather than enhanced magnetic flux which occurs periodically along the length of the shaft between the pole piece projections and the shaft projections. With the shaft projections and pole piece projections displaced axially as above, ferrofluid is deposited through the conducting channel, or at either end of the shaft if accessible, to a location where it is drawn by the uniform magnetic field through the entire seal. Once the ferrofluid is deposited the pole piece projections are returned to their original positions to prepare the seal for use. As before the deposit of ferrofluid, in the ready-for-use configuration the magnetic field is strongest in the gaps, and the deposited ferrofluid is drawn thereinto.

In yet another alternative embodiment, the liquid seal uses capillary action, rather than magnetic fields, to control the seal. A stator and a shaft encompassed by the stator are located in close proximity to each other, and have a sealing liquid maintained between them in a plurality of stages each consisting of an annular ring of liquid. An inner surface of the stator and an outer surface of the shaft have alternating circumferential regions of wettable and non-wettable material, relative to a particular sealing liquid being used. That is, the "wettable" surfaces are such that, when the sealing liquid is in contact with them, it exhibits a relatively low surface tension, while the "non-wettable" surfaces are such that, when the sealing liquid is in contact with them, it exhibits a relatively high surface tension. The result is that the sealing liquid gathers on the wettable surfaces of both the stator and the shaft. Since the wettable surfaces of the stator are aligned axially with the wettable surfaces of the shaft, and the non-wettables surfaces of the stator are aligned with the non-wettable surfaces of the shaft, the sealing liquid forms itself into annular rings, each between a pair of adjacent wettable surfaces, creating a multiple-stage airtight seal around the shaft.

The wettable surfaces of the shaft and stator are axially wider than the non-wettable surfaces in between. Thus, the shaft may be displaced axially relative to the stator to a position at which each of the wettable surfaces of the shaft overlaps axially with two wettable surfaces of the stator, and each wettable surface of the stator overlaps axially with two wettable surfaces of the shaft. In this position, sealing liquid may be introduced at one end of the seal and, with the wettable surfaces overlapping along the length of the seal, the liquid travels along the length of the seal from wettable surface to wettable surface, thus providing sealing liquid to each of the stages of the seal. When the shaft and stator are thereafter repositioned, such that their wettable and non-wettable surfaces are once again axially aligned, the liquid injected into the seal gathers in the gaps between the wettable surfaces of the shaft and stator, held in place by the surface tension of the liquid.

In a variation of the aforementioned embodiment, the shaft may be located within a sleeve that is axially movable relative to the stator. The sleeve has a distribution of wettable and non-wettable surfaces which are axially alignable with the wettable and non-wettable surfaces of the stator. Thus, when filling the seal, it is only necessary to displace the sleeve, rather than the shaft, in order to overlap the wettable surfaces and allow the sealing liquid to flow along the length of the seal.

BRIEF DESCRIPTION OF THE DRAWINGS

For a full understanding of the nature and objects of the invention, reference should be made to the following detailed description taken in conjunction with the accompanying drawings in which.

DETAILED DESCRIPTION OF THE PREFERRED EMBODIMENTS

FIGS. 1–4 show several embodiments of an on-site fillable ferrofluidic seal 5 constructed in accordance with the present invention. In each figure, a conventional two-stage seal is shown. However, other conventional seal configurations can also be used without departing from the spirit and scope of the invention. For purposes of clarity in all figures, only the shaft is illustrated to show three-dimensional perspective.

Figure 1:
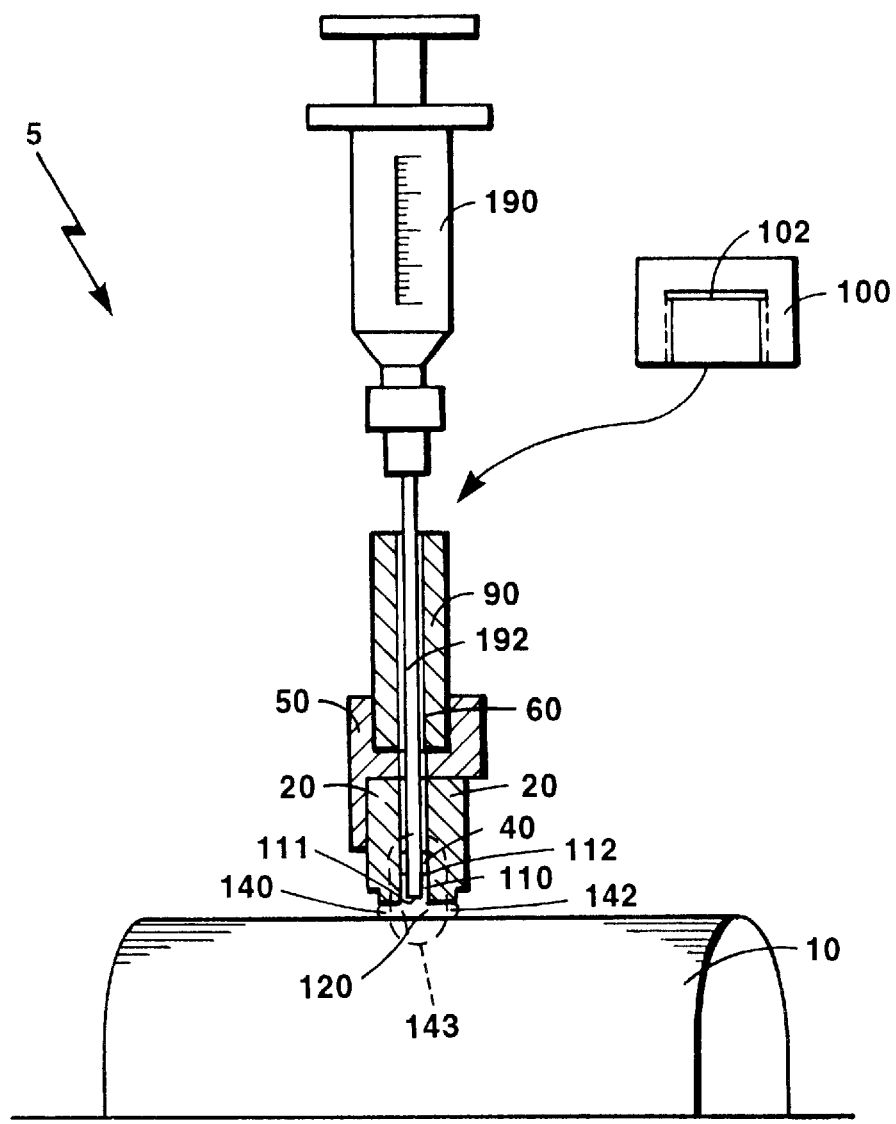
FIG. 1 is a partial cross-sectional view of an on-site fillable ferrofluid seal.

More specifically, in FIG. 1, a fillable ferrofluid seal 5 in accordance with the invention comprises a pair of annular pole pieces 20 which sandwich opposing pole ends of an axially-polarized annular magnet 40. In FIG. 1, pole pieces 20 have smaller inner radii than magnet 40, thus inner annular cavity 110 is defined. Although not shown, the inner radii of pole pieces 20 and magnet 40 could be substantially equal (if substantially equal, no cavity 110 is defined). Pole pieces 20 may have any geometric shape desired, and may comprise any suitable magnetically-permeable material. Pole pieces 20 are composed of martinsitic stainless steel in the preferred embodiment. Magnet 40 is composed from any one of a variety of permanent magnetic materials ranging from low-energy ceramics to high-energy Alnico series alloys, samarium cobalt, mischmetal, and other rare earth alloys, as disclosed in U.S. Pat. No. 4,252,353, issued on Feb. 24,1981, now incorporated by reference. Typically, pole pieces 20 and magnet 40 are located within a housing 50 which is made from a non-magnetic material such as austinitic stainless steel, aluminum, or the like.

Pole pieces 20 and magnet 40 cooperate with a magnetically-permeable shaft 10 to complete the seal mechanical structure. Magnet 40 is magnetized along an axis substantially parallel to that of the shaft and generates a magnetic field which generally follows the magnetic flux path shown as dotted line 143. In particular, the magnetic field extends across gaps 140 and 142 formed between the inner edges of pole pieces 20 and shaft 10.

Seal 5 is completed by filling gaps 140 and 142 with ferrofluid 120, creating a two-stage continuous liquid "O-ring" seal about shaft 10. Ferrofluids used in ferrofluidic seals of this type are known in the art and described in U.S. Pat. No. 3,917,538, issued Nov. 4, 1975 and U.S. Pat. No. 4,356,098, issued Oct. 26, 1982. Any of several ferrofluids commercially available from Ferrofluidics Corporation of Nashua, N.H. can be used in the preferred embodiment of the present invention. The most preferred ferrofluid in the present embodiment is commercially available as grade VSG-803 from Ferrofluidics Corporation.

In the conventional manner of filling seal 5, ferrofluid is injected into cavity 110 by means of a dispenser before shaft 10 is inserted into the seal structure. Without shaft 10 inserted into the seal structure, the magnetic flux path extends from one pole piece to the other across cavity 110 retaining the ferrofluid generally within the cavity and away from the inner edges of the pole pieces. When shaft 10 is subsequently inserted into the seal structure, the magnetic field pattern changes. More particularly, the magnetic field strength in the gaps 140 arid 142 is stronger than the magnetic field strength where ferrofluid was retained prior to inserting the shaft 10. The result is that ferrofluid 120 is attracted into gaps 140 and 142 to form the seal.

However, in accordance with the present invention, seal 5 has a conducting channel 60 which provides direct access to a location 111 within cavity 110 where ferrofluid, when deposited, will be drawn to gaps 140 and 142 by the magnetic field in the gaps 140 and 142 when shaft 10 is present. Depending upon the pole piece/magnet assembly shape and configuration, deposition of ferrofluid in cavity 110 at a location closer to magnet 40 than location 111 could result in the ferrofluid being drawn by the magnetic field to inner corners 112 of cavity 110, rather than to annular gaps 140 and 142. Therefore a non-magnetic syringe needle 192, from a syringe 190, may be inserted into conducting channel 60 to deposit ferrofluid at the desired location. Syringe 190 is advantageously graduated or otherwise equipped to supply a known, adequate quantity of ferrofluid to seal 5 without waste. Syringe 190 may also be used to provide sufficient pressure within the seal to expel worn ferrofluid from the gaps prior to refilling with fresh fluid. Thus, the pole piece/magnet assembly of seal 5 may first be installed over shaft 10 and the seal subsequently filled and/or refilled while assembled and while the shaft and seal are in stationary or rotational relation with each other.

A non-magnetic filler tube (not shown) may be permanently or removably placed in conducting channel 60 and used in place of needle 192 to guide ferrofluid through outer housing 50, between pole pieces 20, and through magnet 40 to location 111 from which the ferrofluid will be drawn to gaps 140 and 142. Needle 192 or the filler tube serve the function of allowing ferrofluid to be forced past magnet 40 so as not to be retained substantially above cavity 110. If a filler tube is used, needle 192 will not extend to location 111, but will generally terminate within the filler tube above location 111. Additionally, if a filler tube is employed, any means for introducing ferrofluid into the tube and advancing the ferrofluid to location 111 may be used, including but not limited to the syringe. The filler tube may be mounted within channel 60, or the filler tube and the channel may be one and the same.

Guide tube 90 may be optionally mounted within or on housing 50 to guide syringe 190 and needle 192. Guide tube 90 can be closed by means of an optional removable cap 100 which seals the tube to maintain any intermediate pressure or vacuum between the seal stages. Since this intermediate pressure is often considerably different from atmospheric pressure, with cap 100 in place the seal's pressure capacity is approximately doubled over the capacity when the filler tube is open. Cap 100 may comprise a Bakelite cap (available from Union Carbide Corporation of New York, N.Y.), aluminum cap, or other variety, and may include a gasket seal 102 to enhance the pressure-tight seal. This gasket 102 may be a neoprene gasket or other variety. The interior of cap 100 and the exterior of guide tube 90 may be threaded so that the cap may be screwed onto the guide tube, enhancing sealing strength. Alternatively, a threaded plug may be screwed into an interior-threaded guide tube 90 to achieve sealing. Guide tube 90 may also be sealed with a plug such as a rubber bung or equivalent (not shown), and the filler tube or channel 60 may be sealed by such means as well.

Ideally, syringe 190 engages guide tube 90 when fully inserted into the guide tube/channel assembly in a manner such that the end of needle 192 is displaced within cavity 110 at the desired location 1 11 for ferrofluid deposit. Syringe 190 may be threaded so as to engage guide tube 90 in the same manner as cap 100 or equivalent plug, and as such is advantageously positioned, as described above, such that needle 192 will deposit ferrofluid at location 111. Conducting channel 60 may have a cross-section that is circular, square, or any other shape as long as ferrofluid can be supplied to the above-noted location through syringe needle 192, the filler tube, or the channel. Preferably, seal 5 has a single conducting channel 60 as shown although a plurality of channels may be provided and spaced at intervals around the periphery of the magnet 40. Preferably, conducting channel 60 has a substantially circular cross-section, with an approximate diameter of 0.10", although channels with other diameters may be used.

It is to be understood that the tube/channel sealing methods described herein, or their equivalents, may be selected for the particular requirements of this and all embodiments disclosed herein.

Figure 2:
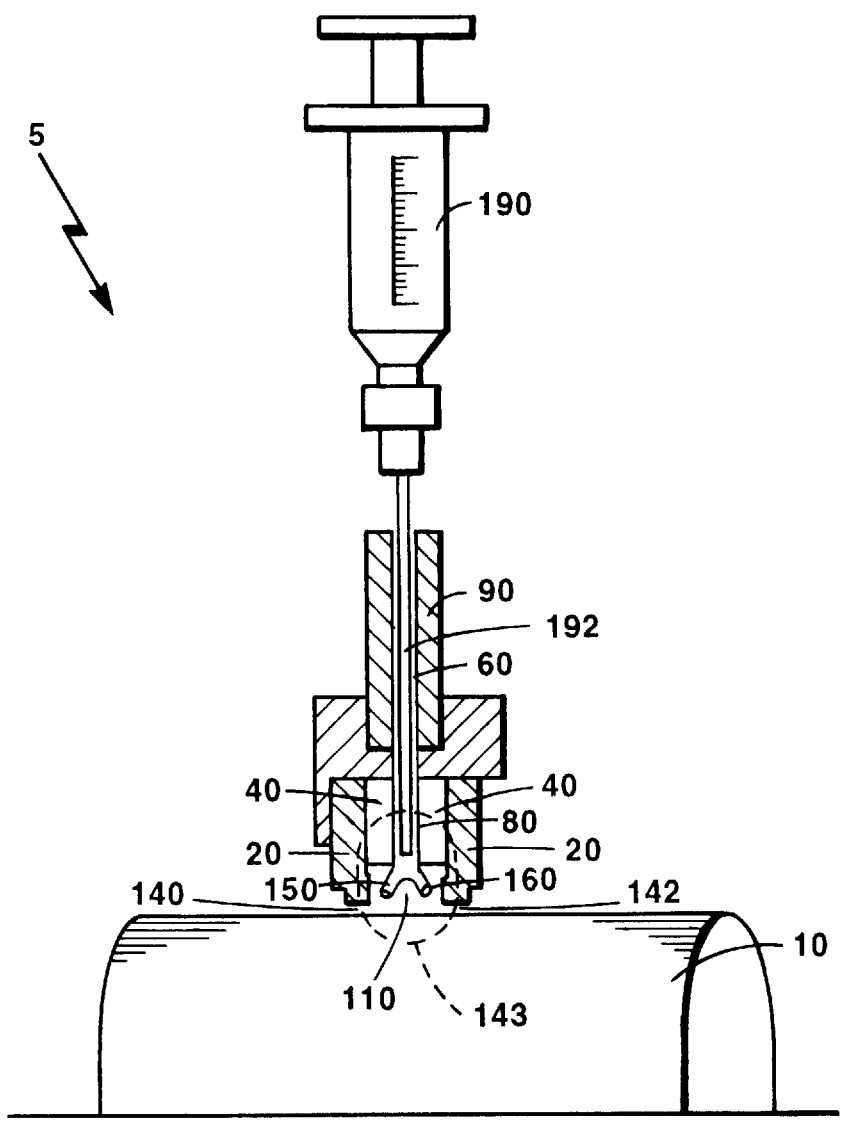
FIG. 2 is a partial cross-sectional view of a second embodiment of the on-site fillable ferrofluid seal.

FIG. 2 illustrates a second embodiment of the invention showing a cross-sectional view of the on-site fillable ferrofluid seal 5. Elements in FIG. 2 have numeral designations which correspond to those numeral designations used in FIG. 1. Seal 5 in FIG. 2 is similar to that illustrated in FIG. 1, except that filler tube 80 is illustrated which includes a portion located in the inner annular cavity 110 that forks in two directions. One portion 150 of tube 80 terminates near one of the gaps 140 and the other portion 160 of tube 80 terminates near the other gap 142. The portions 150 and 160 direct ferrofluid (not shown) to gaps 140 and 142 by depositing ferrofluid at locations within cavity 110 where it will be drawn by the magnetic field to the gaps. This embodiment is useful when a magnet 40 with a large axial width is used or with other embodiments in which deposition of ferrofluid at one location may not result in efficient ferrofluid migration to desired locations. If more locations than two need be addressed, the filler tube 80 of FIG. 2 may have a plurality of branches in excess of two. Any convenient means of sealing channel 60 or filler tube 80 such as those described above with respect to FIG. 1 may be employed.

Figure 3:
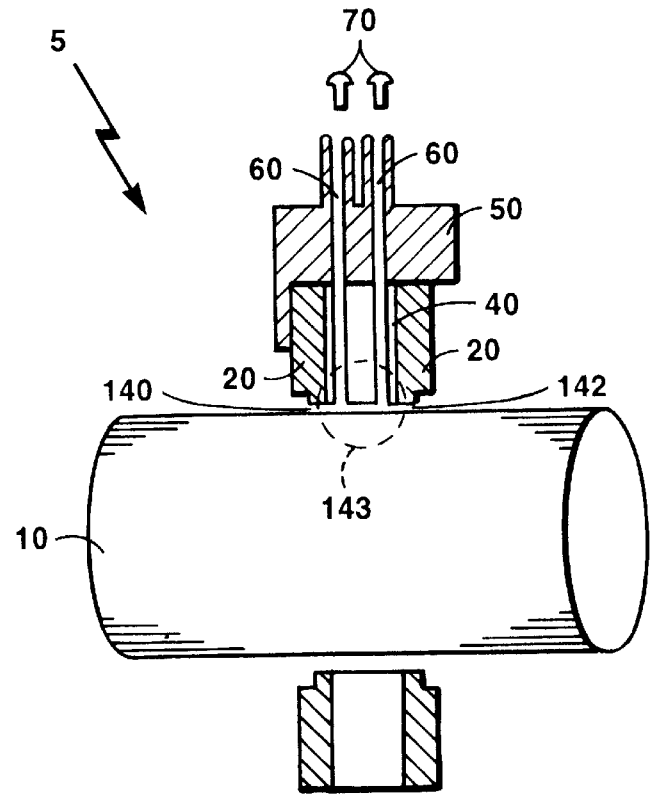
FIG. 3 is a partial cross-sectional view of a third embodiment of the on-site fillable ferrofluid seal.

FIG. 3 is a partial cross-sectional view of a third embodiment of the on-site fillable ferrofluid seal. Elements in FIG. 3 have numeral designations which correspond to those numeral designations used in previous figures. Seal 5 in FIG. 3 includes a pair of conducting channels 60 and, for purposes of illustrating another embodiment of the pole piece/magnet arrangement, the radii of pole pieces 20 and magnet 40 are substantially equal, leaving no inner annular cavity 110. As in the embodiment shown in FIG. 2, the pair of axially-disposed conducting channels 60 are desirable where a magnet with a large axial width is used. Each channel 60 is disposed near one of the gaps 140 or 142 so that deposit of ferrofluid 120 through channel 60 will place the ferrofluid 120 in a location where the magnetic field will draw the fluid 120 to the gap 140 or 142. Alternatively, any number of channels may be incorporated into the arrangement and may pass through the pole pieces as well as the magnet. A pair of rubber plugs, or bungs 70 are illustrated in sealing each channel 60 in FIG. 3. However, any suitable sealing means, including those described above, may by employed in this embodiment. As is the result with channel sealing with the cap described in FIG. 1, the pressure differential which the seal 5 can support is approximately doubled with use of the rubber bungs 70.

Figure 4:
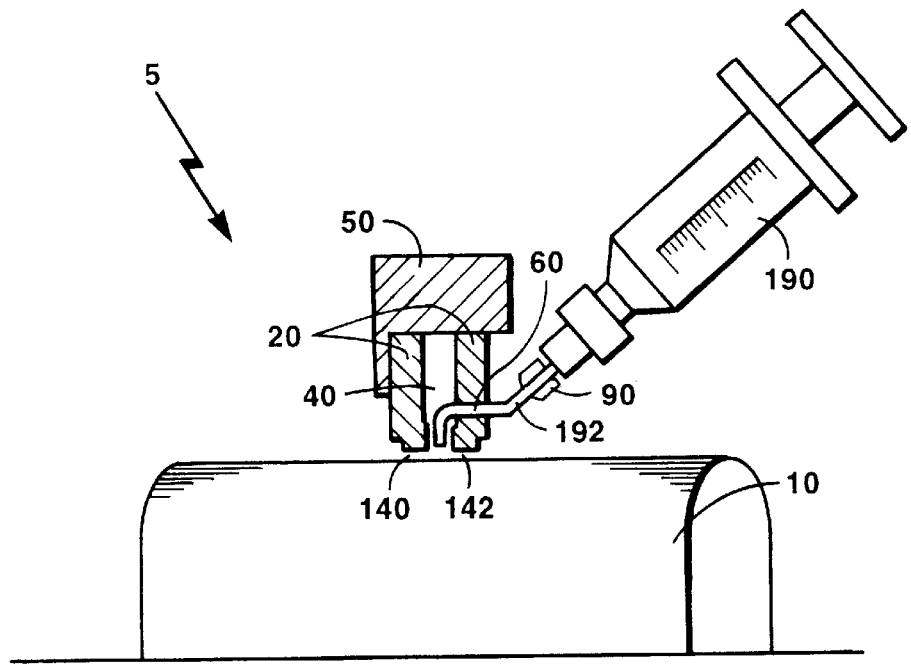
FIG. 4 is a partial cross-sectional view of a fourth embodiment of the on-site fillable ferrofluid seal.

FIG. 4 shows a fourth embodiment of the invention showing another partial cross-sectional view of the fillable ferrofluid seal 5. Elements in FIG. 4 have numeral designations which correspond to those numeral designations used in previous figures. Seal 5 in FIG. 4 is similar to the those described above except that conducting channel 60 extends through a portion of magnet 40 and also through a portion of one of the pole pieces 20. In this embodiment, channel 60 and filler tube 80 are one and the same.

Figure 5A:
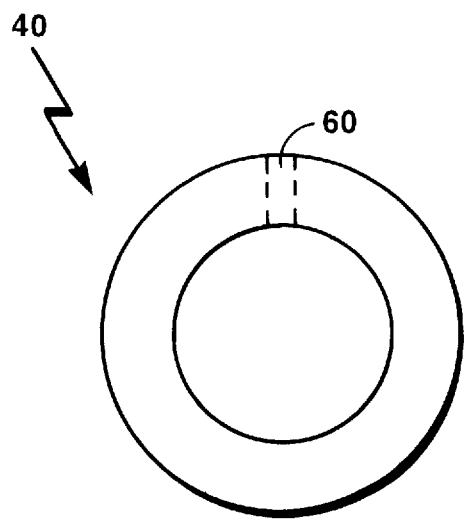
FIG. 5(a) is side view of a one configuration for the magnet for the on-site fillable ferrofluid seal.
Figure 5B:
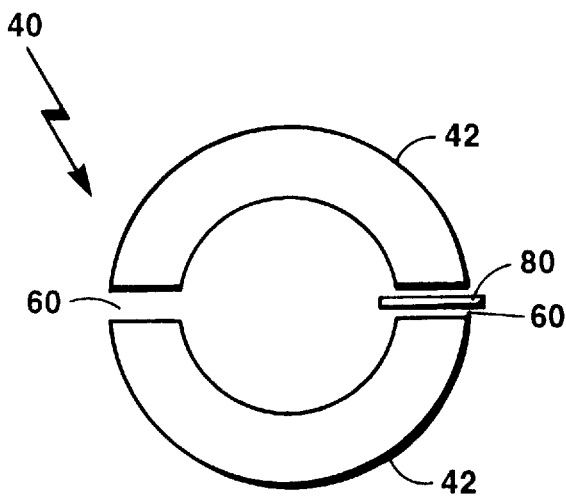
FIG. 5(b) is side view of a second configuration for the magnet for the on-site fillable ferrofluid seal.
Figure 5C:
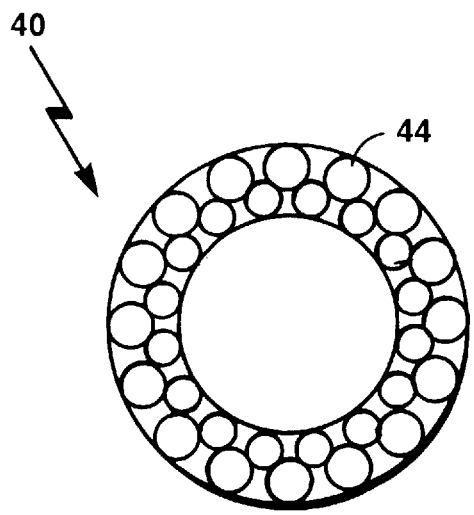
FIG. 5(c) is side view of a third configuration for the magnet for the on-site fillable ferrofluid seal.

FIGS. 5(a), 5(b), and 5(c) show side views of three of several possible configurations for magnet 40 for use in accordance with the present invention. FIG. 5(a) shows the configuration for magnet 40 disclosed in most of the figures. The magnet 40 has a substantially annular shape and is in one piece. Channel 60, which may pass through magnet 40 or which may comprise a gap in the entire width of magnet 40, is represented by dotted lines. Most commonly, channel 60 passes through magnet 40, and has a width less than the width of the magnet. Although generally a one-piece annular magnet 40 is used in seals of the present invention, magnet 40 need not be annular or in one piece and often is not. FIG. 5(b) shows a second possible configuration for magnet 40 in which the magnet is split into two magnet half-circles 42. This configuration includes voids which comprise channels 60, and, preferably, allow convenient placement of filler tube 80. For purposes of illustration, a filler tube 80 is shown in one void or channel 60 only. It is to be understood that the magnets may be split into any number of portions with any number of voids or channels 60, any number of these voids or channels containing filler tubes 80. Although not shown, conducting channel 60 may pass through one of the magnet half-circles 42. FIG. 5(c) shows a third possible configuration for the magnet 40. According to this embodiment, an array of magnet pieces 44 form the magnet 40. The concentric circles bordering the magnet pieces 44 are for purposes of illustration only and do not necessarily represent components of the apparatus of the present invention. It can be seen that this configuration allows for one or more conducting channels to pass between the magnet pieces 44 (if such pieces are sized appropriately) or through one or more voids created by the permanent or temporary removal of one or more magnet pieces. However, channels could also pass through the magnet pieces 44 (not shown). The configuration in FIG. 5(c) is the least expensive to manufacture and is frequently used. The gaps between the magnet pieces 44 require the magnet region 40 shown in FIG. 5(c) to be larger than the one-piece magnet shown in FIG. 5(a) to achieve the same strength for the magnetic field. Although three possible configurations for the magnet 40 are shown, this listing is only illustrative and is not exhaustive.

FIGS. 6(a), 6(b), 6(c), and 6(d) disclose an embodiment for an on-site fillable ferrofluid seal particularly applicable to multi-stage seals. Multi-stage seals are often used in applications in which a relatively large pressure differential between two environments must be maintained. Each stage increases the pressure difference which the multi-stage seal can support.

In FIGS. 6(a), 6(b), 6(c), and 6(d) the multi-stage seal 5 has at least one conducting channel 60 extending through the magnet 40 whose opposing pole ends are sandwiched by a pair of pole pieces 20. For purposes of illustration in FIGS. 6(a–d), only conducting channel 60, and not filler tube 80 and/or syringe 190 with needle 192 are illustrated, and rubber bung 70 seals channel 60. However, any desirable combination of the components noted above with respect to previous figures may be employed in the embodiment illustrated in FIGS. 6(a–d). Although not shown, conducting channel 60 may also pass through one of the pole pieces 20 or through one of the pole pieces 20 and the magnet 40. Pole pieces 20 each have a plurality of axially-spaced projections 22, each separated by a plurality of cavities 24. For purposes of illustration only, each pole piece 20 has three projections 22. Generally, pole pieces 20 have from about 10 to about 30 projections each, and may have more or less projections without affecting the operation of the invention.

According to the present invention, shaft 10 also includes a plurality of projections 11, which may be machined into the magnetically-permeable shaft. Projections 11 preferably correspond in width and number to the width and number of projections 22 on pole pieces 20. Projections 11 and projections 22 may have any radius, width and geometric shape desired. For example, they may be substantially triangular, substantially square, rounded or of any other configuration. Typically, the projections 11 and 22 have widths on the order of 0.10"–0.050" and have substantially square or rectangular cross sections.

Figure 6A:
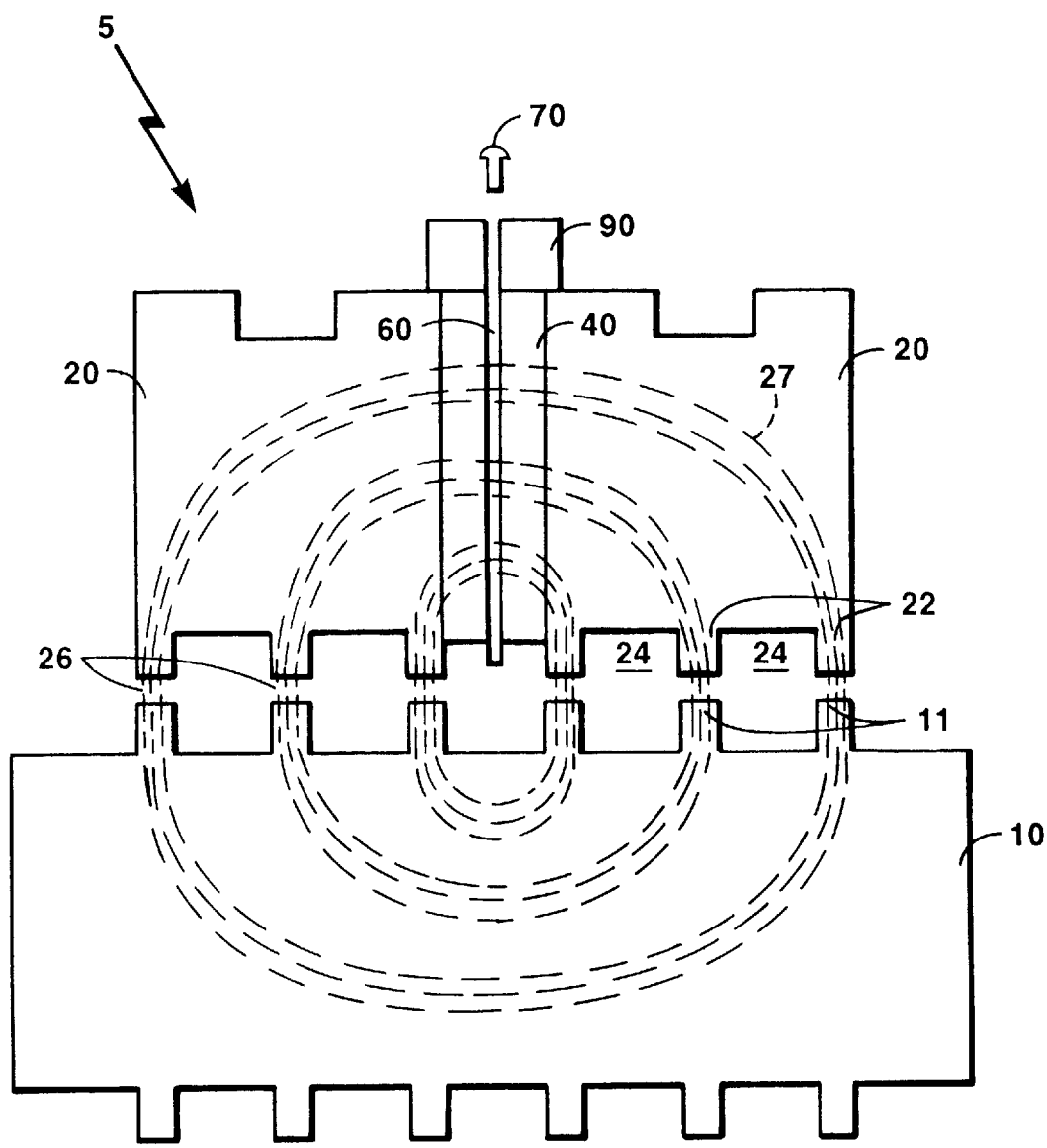
FIG. 6(a) is a partial cross-sectional view of an on-site fillable multi-stage ferrofluid seal prior to filling with ferrofluid.

FIG. 6(a) shows the seal in its operating position, absent ferrofluid. Magnet 40 generates a magnetic field, which field follows a magnetic circuit containing magnet 40, pole pieces 20, projections 11 and 22, gaps 26 formed between projections 11 and 22, and shaft 10. The magnetic field is represented by flux path 27, and the shape of the projections 11 and 22 serves to concentrate magnetic flux within gaps 26. With projections 11 and 22 aligned substantially axially as shown in FIG. 6(a), the seal is in a position of minimum magnetic potential energy. That is, if shaft 10 were displaced axially from this position, a magnetic force would exist on the shaft in a direction toward re-alignment.

Figure 6B:
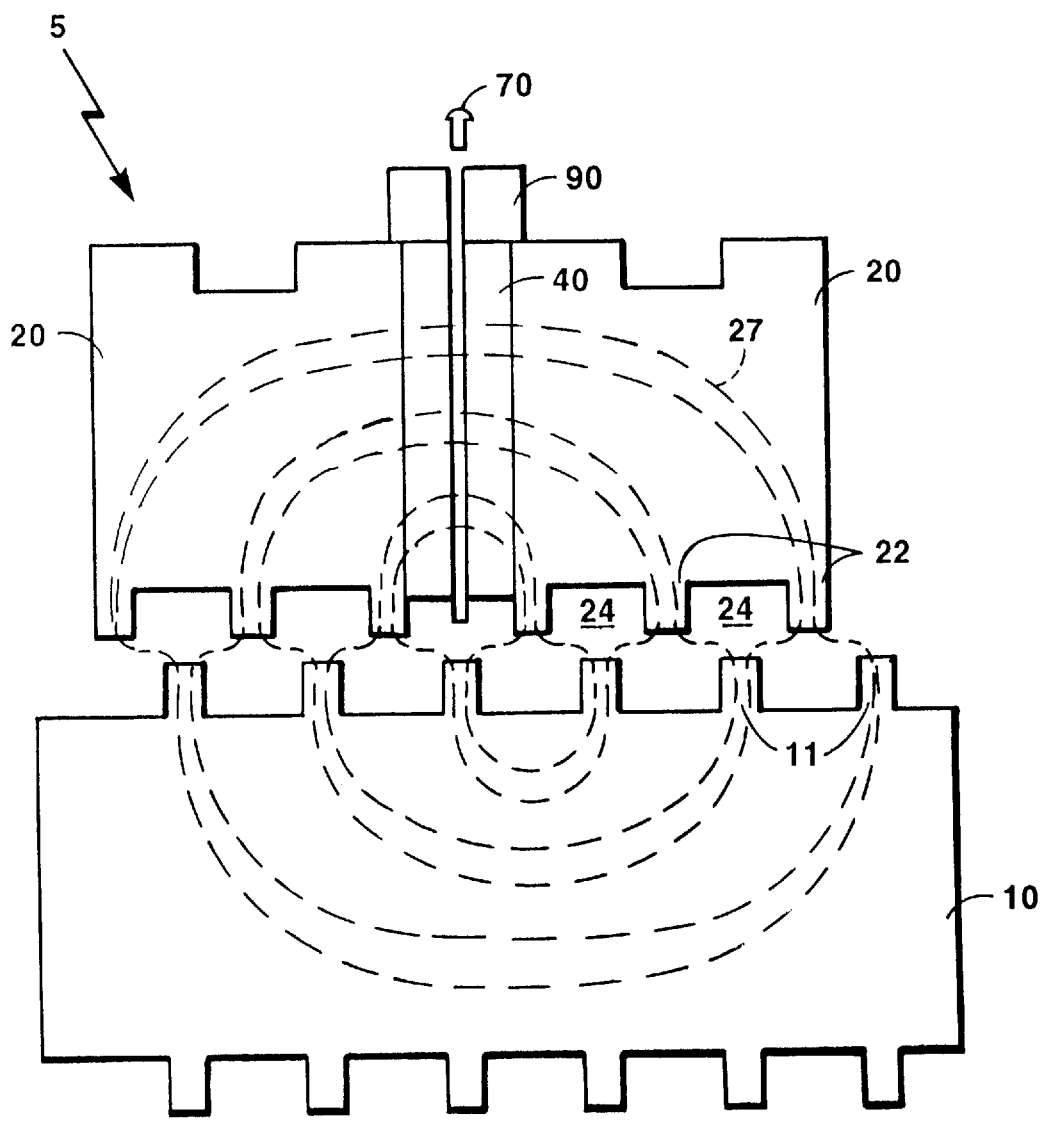
FIG. 6(b) is a partial cross-sectional view of an on-site fillable multi-stage ferrofluid seal with the seal positioned in the filling position.

In FIG. 6(b), the seal has been positioned for applying or reapplying ferrofluid. Such positioning involves axial displacement of the shaft relative to the pole pieces such that projections 11 and 22 are no longer aligned axially, but are staggered with projections 11 falling roughly halfway between opposing projections 22. Such displacement shifts the seal from a state of minimum magnetic potential energy to a state of maximum magnetic potential energy. That is, with the projections equally staggered as shown in FIG. 6(b), magnetic force is balanced, but any displacement of shaft 10 in either direction axially will be "down hill" in terms of magnetic potential energy and the shaft will be drawn to a position in which projections 11 and 22 are once again axially aligned. With projections 11 and 22 staggered as in FIG. 6(b), the magnetic field is not concentrated in discrete locations in the inter-projection region, but magnetic flux is evenly distributed in the inter-projection region. That is, a single, continuous region of high magnetic flux traverses the entire region between the magnetic/pole piece assembly and the shaft, circumferentially and axially.

To achieve such displacement, the pole piece/magnet assembly must be displaceable axially relative to the shaft, or the shaft must be displaceable axially relative to the pole piece/magnet assembly. For purposes of illustration of several methods for achieving such displacement, the latter example will be discussed. According to one method, shaft 10 of the housing (not shown) may be equipped with means for measuring the axial displacement of the shaft relative to the pole piece/magnet assembly, such that displacement as shown in FIG. 6(b) can be achieved automatically or manually by measuring the amount of displacement.

Alternatively, forces which are exerted on the shaft and which depend upon the state of magnetic potential energy discussed above can be exploited in measuring displacement. If the technician or other operator manually axially displaces the shaft relative to the pole piece/magnet assembly as shown in FIG. 6(b), he can feel the shaft move from the region of low magnetic potential energy to the region of high magnetic potential energy, where the forces are balanced, and back to a new region of low magnetic potential energy, etc. That is, when the technician feels that the shaft is displaced to a balanced position, but where displacement of the shaft in either direction would cause the shaft to be attracted away from that balanced position and to a region of low potential energy, the advantageous displacement as shown in FIG. 6(b) has been achieved.

Figure 6C:
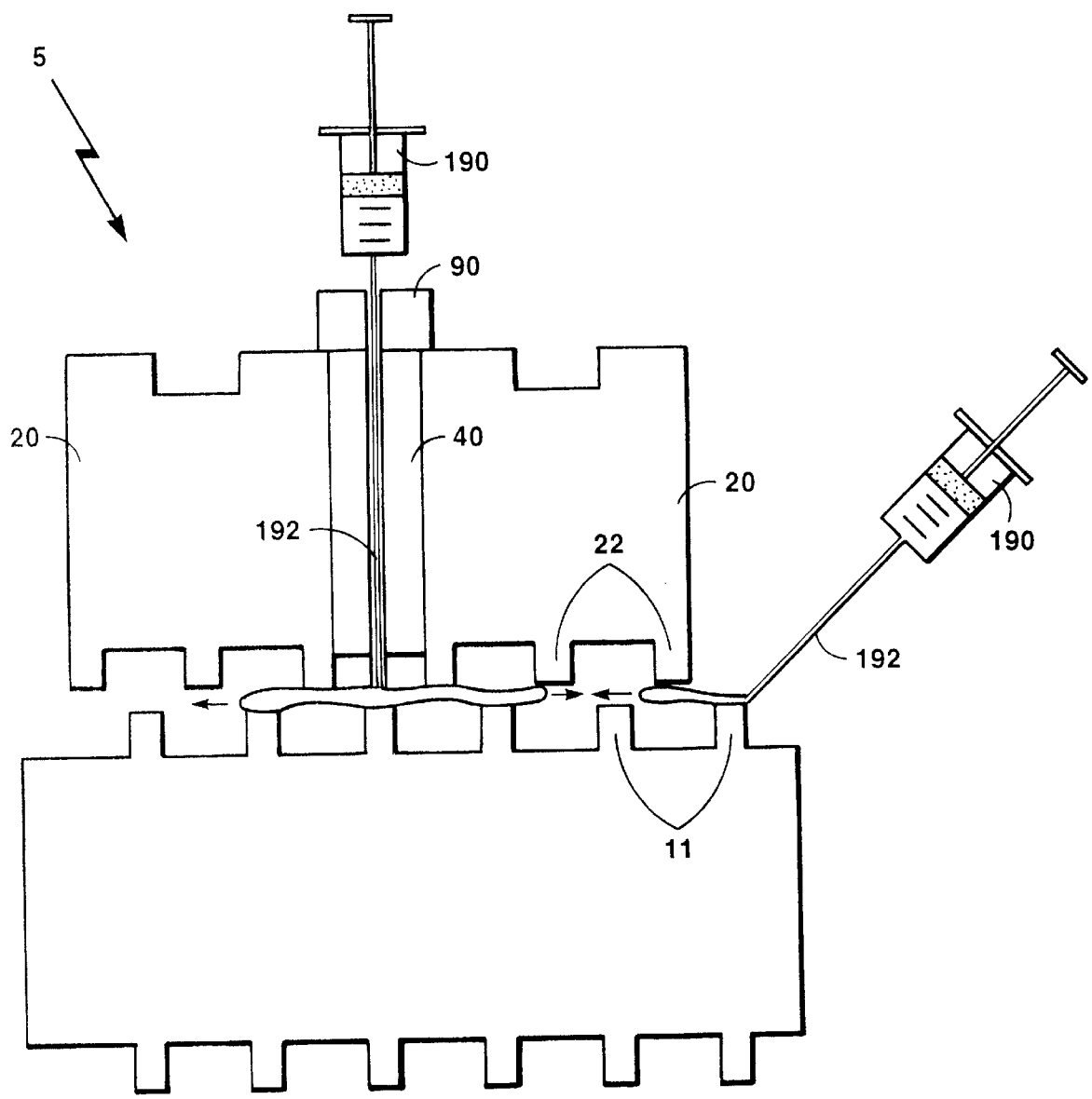
FIG. 6(c) is a partial cross-sectional view of an on-site fillable multi-stage ferrofluid seal in the process of being filled.
Figure 6D:
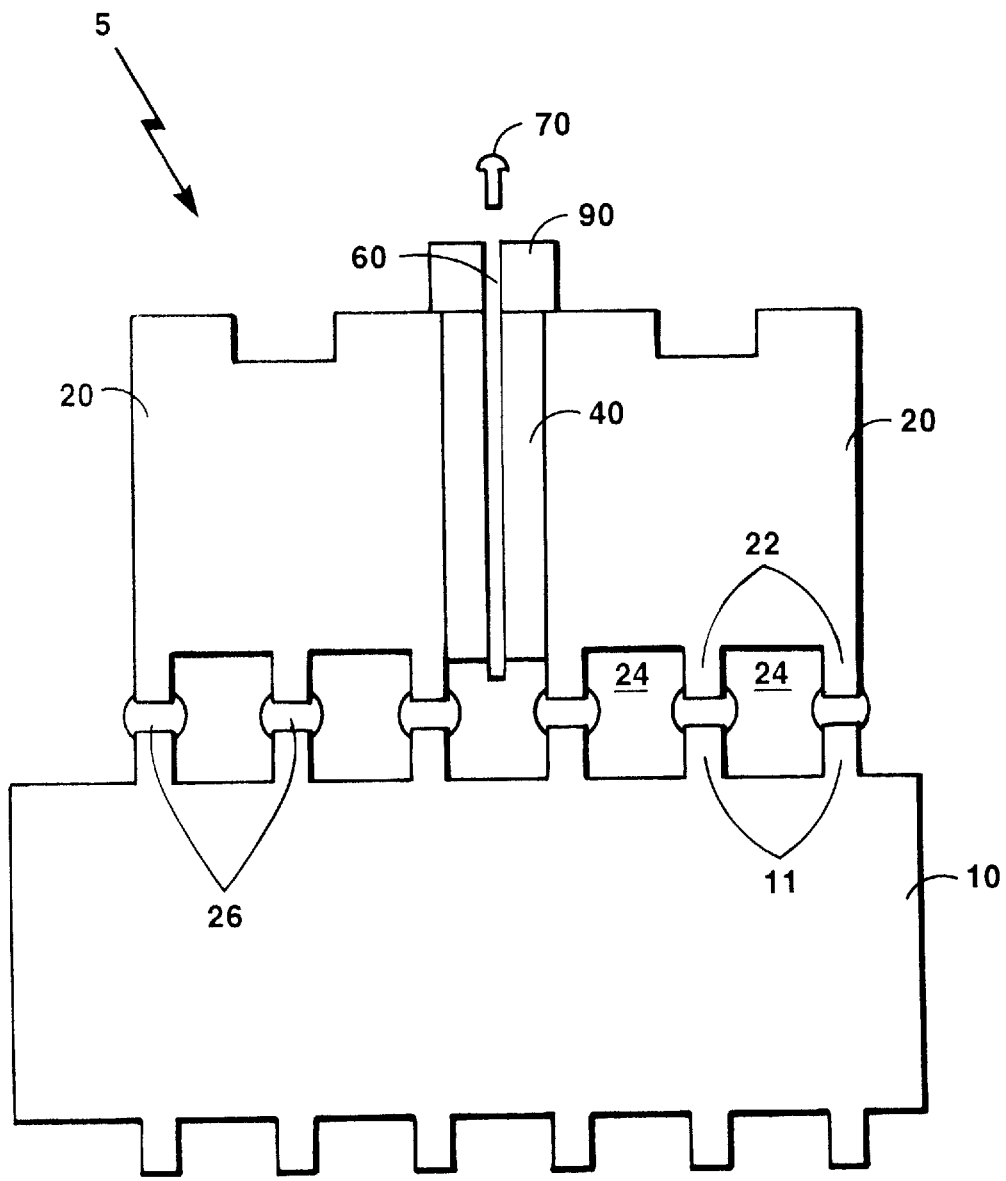
FIG. 6(d) is a partial cross-sectional view of the on-site fillable multi-stage ferrofluid seal which has been filled and placed in operating position.

In FIG. 6(b), the seal has been positioned for applying or re-applying ferrofluid. Consequently, as illustrated in FIG. 6(c), ferrofluid deposited through conducting channel 60 or at an accessible end of the shaft/pole piece assembly by syringe or other means discussed above is drawn by the continuous flux region throughout seal 5 and distributed evenly therein. According to the present invention, ferrofluid may be introduced at either end of the shaft or through a channel depending upon the accessibility of the ends or of a channel in the assembly. Once the ferrofluid has been deposited therein, the shaft and pole piece/magnet assembly are re-positioned as illustrated in FIG. 6(d) such that projections 11 and 22 are re-aligned axially. Once this re-alignment is effected, the magnetic flux path is no longer uniform through the region, but is enhanced at gaps 26 between projections 11 and 22 as illustrated in FIG. 6(a). Ferrofluid is drawn into these gaps, forming a series of stages of the multi-stage seal in gaps 26, as shown in FIG. 6(d) with ferrofluid evenly distributed in the seal.

Figure 7:
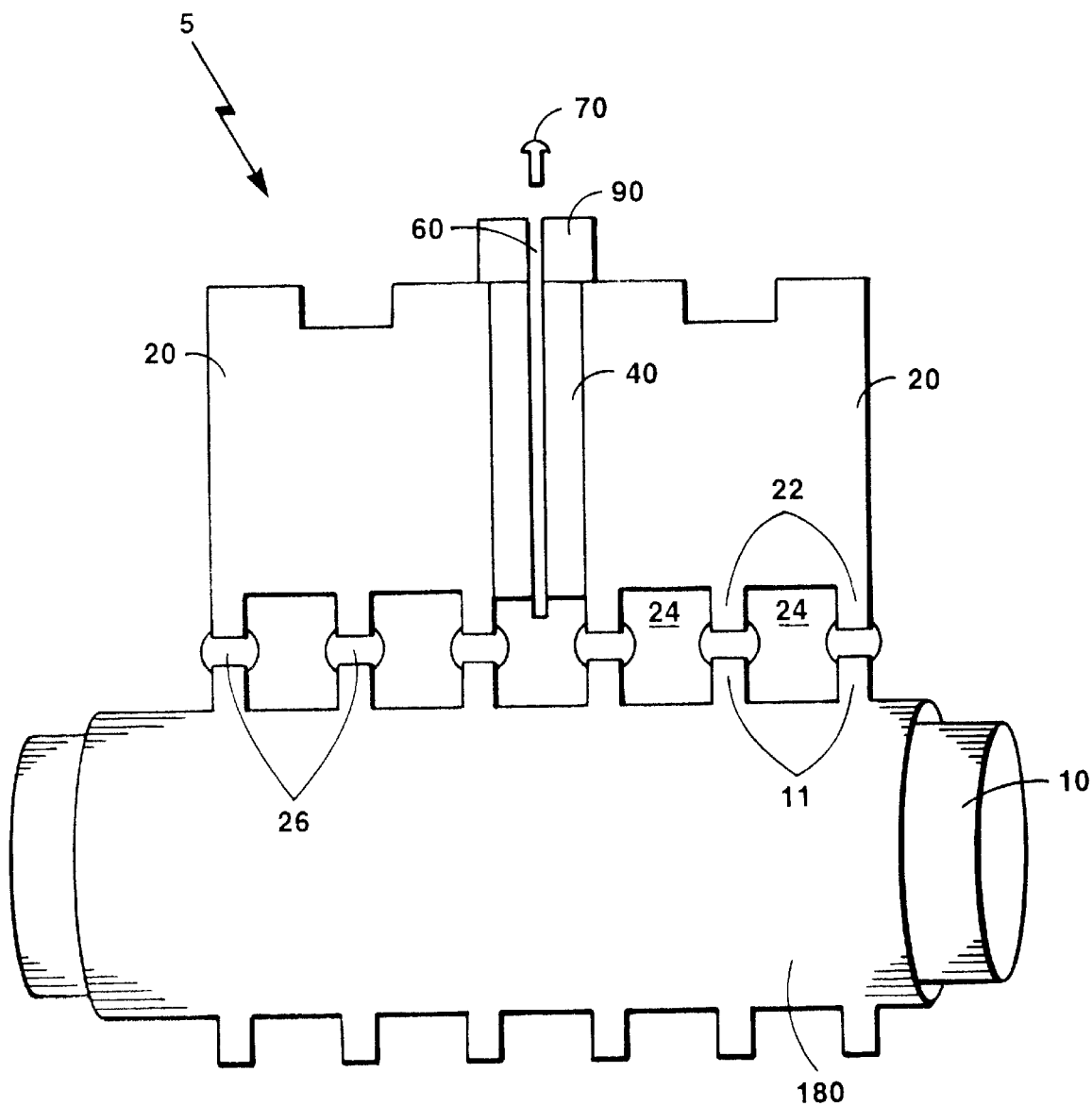
FIG. 7 is a partial cross-sectional view of a second embodiment of an on-site fillable multi-stage ferrofluid seal.

FIG. 7 illustrates another embodiment for an on-site multi-stage fillable ferrofluid seal 5. Seal 5 in FIG. 7 is similar to those illustrated in FIGS. 6(a), 6(b), 6(c), and 6(d), except that shaft 10 has no projections. Instead a sleeve 180 includes a plurality of projections 130. Sleeve 180 is mounted over shaft 10 and is retained thereon by means (not shown) such as a tab on the inside of the sleeve which interlocks with a mate on the shaft. Sleeve 180 may be permanently or temporarily mounted on shaft 10, and is advantageously capable of being axially displaced relative to the shaft such that projections 11 may be displaced axially relative to projections 22, and the filling method described above with respect to FIGS. 6(a–d) employed, without the need of displacing shaft 10 relative to the pole piece/magnet assembly.

Figure 8:
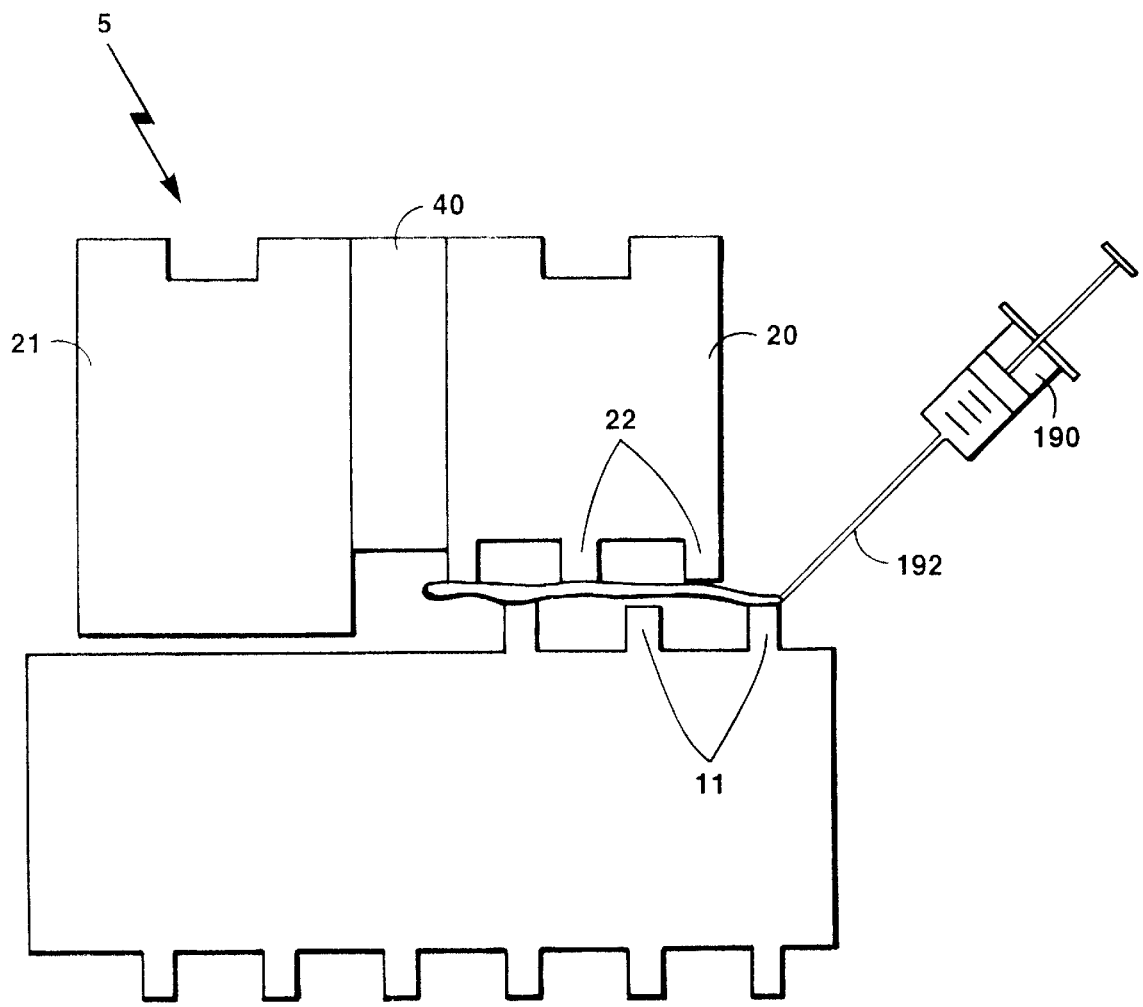
FIG. 8 is a partial cross-sectional view of a third embodiment of an on-site multi-stage ferrofluid seal utilizing a single multi-stage pole piece.

FIG. 8 discloses yet another embodiment for an on-site multi-stage fillable ferrofluid seal 5. Seal 5 in FIG. 8 is similar to those illustrated in FIGS. 6(a), 6(b), 6(c), 6(d) and 7, except that only one multi-stage pole piece 20 is used (the numeral designations used in FIGS. 6, 7 and 8 to designate similar parts are the same). In certain applications pole piece 20 will have sufficient number of stages to support the desired pressure differential. In this embodiment, the second pole piece 21 is used for magnetic flux return purposes only. This configuration could be filled with ferrofluid from outside by means of a syringe 190 or by means of an external fill tube (not shown). FIG. 8 illustrates the seal with the pole piece and shaft axially displaced in a manner similar to FIG. 6(b) for filling purposes. After filling, the seal and shaft are repositioned to allow the pole piece projections to align with the shaft projections in a manner similar to FIG. 6(d).

An alternative liquid sealing apparatus to the ferrofluidic seals described above is shown in FIGS. 9(a)–9(c). The sealing apparatus is similar to ferrofluid seals in that it is a multistage seal which maintains a liquid between a surface of a rotatable shaft 200 and a stator 202. For ease of description, the stator is shown in cross section, while the shaft is not. Furthermore, only one side of the stator is shown. However, those skilled in the art will understand that the stator 202 completely surrounds the shaft 200, the separation between the stator 202 inner surface and the shaft 200 outer surface being constant around the circumference of the shaft 200.

In the vicinity of the seal, the outer surface of shaft 200 consists of interspersed circumferential bands of alternating surface material. Bands 204 consist of a material which is highly wettable relative to a sealing liquid used with the seal. Bands 206 consist of a material which is highly non-wettable relative to the sealing liquid used with the seal. A matching distribution of surface material is located on the inner surface of stator 202, such that, along the axial direction of the shaft, highly wettable surfaces 208 of the stator 200 are aligned with highly wettable surfaces 204 of the shaft, and highly non-wettable surfaces 210 of the stator 200 are aligned with highly non-wettable surfaces 206 of the shaft. In the cross section of the stator 202 in FIG. 9(a), the thickness of wettable surfaces 208 is somewhat exaggerated to show their location relative to the shaft 200. However, it will be apparent that the wettable surfaces 208 and the non-wettable surfaces 210 of the stator are each complete annular surfaces surrounding the shaft 200.

In the context of this disclosure, the term "wettable" is intended to refer to the property of a material which results in a particular liquid in contact with it exhibiting a relatively low surface tension, while "non-wettable" refers to an inverse property by which a liquid in contact with the surface exhibits a relatively high surface tension. Thus, a particular liquid has an affinity for a wettable surface, but is repelled by non-wettable surfaces. Where wettable and non-wettable surfaces are adjacent to each other, the liquid tends to locate itself in contact with the wettable surface, while tending away from the non-wettable surface.

Figure 9A:
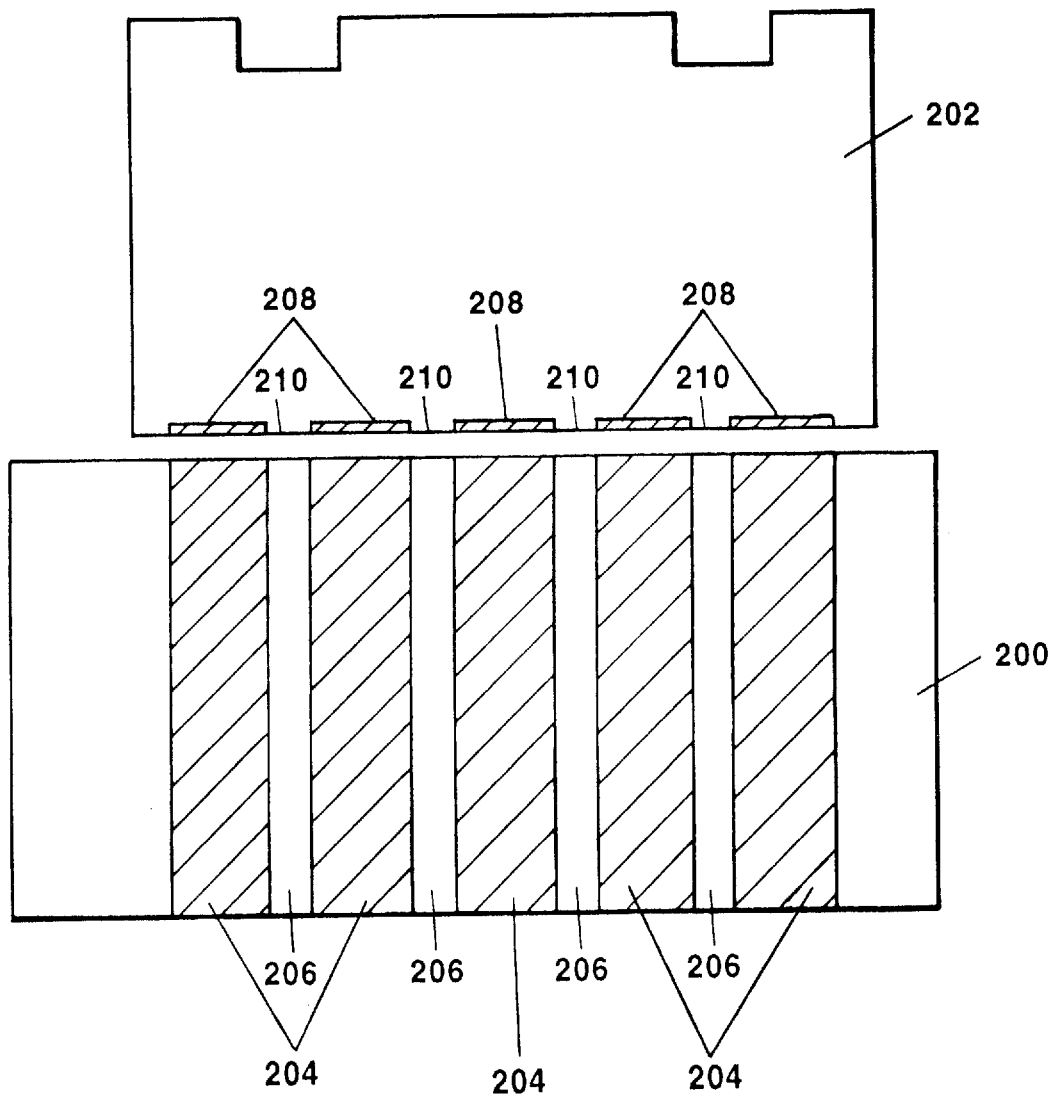
FIG. 9(a) is a partial cross-sectional view of an embodiment of the seal in which the capillary action of a sealing liquid is used to form multiple seal stages.

The seal apparatus shown in FIG. 9(a) operates as a multi-stage "capillary" seal in that liquid is introduced between the shaft 200 and the stator 202, and maintains continuous circumferential contact with both the outer surface of the shaft 200 and the inner surface of the stator 202, and thereby provides an airtight seal along the length of the shaft 200. With the shaft 200 and stator 202 in the position shown in FIG. 9(a), the alignment of the wettable surfaces 204 of the shaft with the wettable surfaces 208 of the stator 202, and the alignment of the non-wettable surfaces 206 of the shaft 202 with the non-wettable surfaces 210 of the stator 202, results in the liquid collecting in between the opposing wettable surfaces 204, 208 of the shaft 200 and stator 202, thereby creating a series of annular seal stages along the axial length of the shaft 200.

In the preferred embodiment, in which the seal is used for vacuum sealing purposes, the preferred liquid is a liquid metal. Particularly preferable is Gallium, which has a very low vapor pressure (i.e. it does not evaporate much), a very low viscosity (allowing the seal to operate without much drag on the shaft), very low permeability (i.e. it tends not to allow leakage through it) and very high thermal conductivity, which can be useful for cooling purposes. A disadvantage is that the freezing point of Gallium is near room temperature. An alternative liquid is a Gallium/Indium/Tin alloy (62%/22%/16%) which is commercially available and works nearly as well as pure Gallium, but which has a lower freezing point (~5° C.). This lower freezing point extends the temperature range within which the seal can function.

With the use of Gallium as a sealing liquid in the preferred embodiment, choices for the wettable material for wettable surfaces 204, 208 includes several oxide free metals. Many oxide free metals are attacked by Gallium, which dissolves them or alloys with them. However, the refractory metals Tungsten and Molybdenum, Niobium and Tantalum are not attacked by Gallium and are thereby suitable choices. In the preferred embodiment, Molybdenum is selected for its lower price and better machinability. For the non-wettable surfaces 206, 210, a selection may be made from a number of different materials including Alumina, Boron Nitride, Silicon Nitride and Titanium Dioxide. In the preferred embodiment, Titanium Dioxide is used because it may be readily applied as a coating, and can survive the thermal processing needed to remove harmful oxygen from the refractory metal. Another possible combination of materials uses mineral oil as a liquid, steel as the wettable surface material and fluorocarbons, such as Teflon (PTFE) as the non-wettable surface material.

In the present embodiment, the liquid may be introduced to the seal in a manner similar to the introduction of ferrofluid to the seals discussed above. The shaft 200 is displaced axially relative to the stator 202 such that the wettable surfaces 204 of the shaft are no longer aligned with the wettable surfaces 208 of the stator 202. The shaft 200 and stator 202 are shown in their displaced position in FIG. 9(b). The relative displacement is sufficient that the wettable 204 surfaces of the shaft each overlaps axially with two wettable surfaces 208 of the stator 202. That is, when the shaft is displaced, the axial position of the wettable surfaces 204 relative to the axial position of the wettable surfaces 208 is such that each wettable surface 204 of the shaft 200 is axially adjacent to two different wettable surfaces 208 of the stator, and each wettable surface 208 of the stator 202 is axially adjacent to two different wettable surfaces of the shaft 200. In order to allow such corresponding overlap of the wettable surfaces, the axial width of the wettable surfaces 204, 208 must be greater than the axial width of the non-wettable surfaces 206, 210.

Figure 9B:
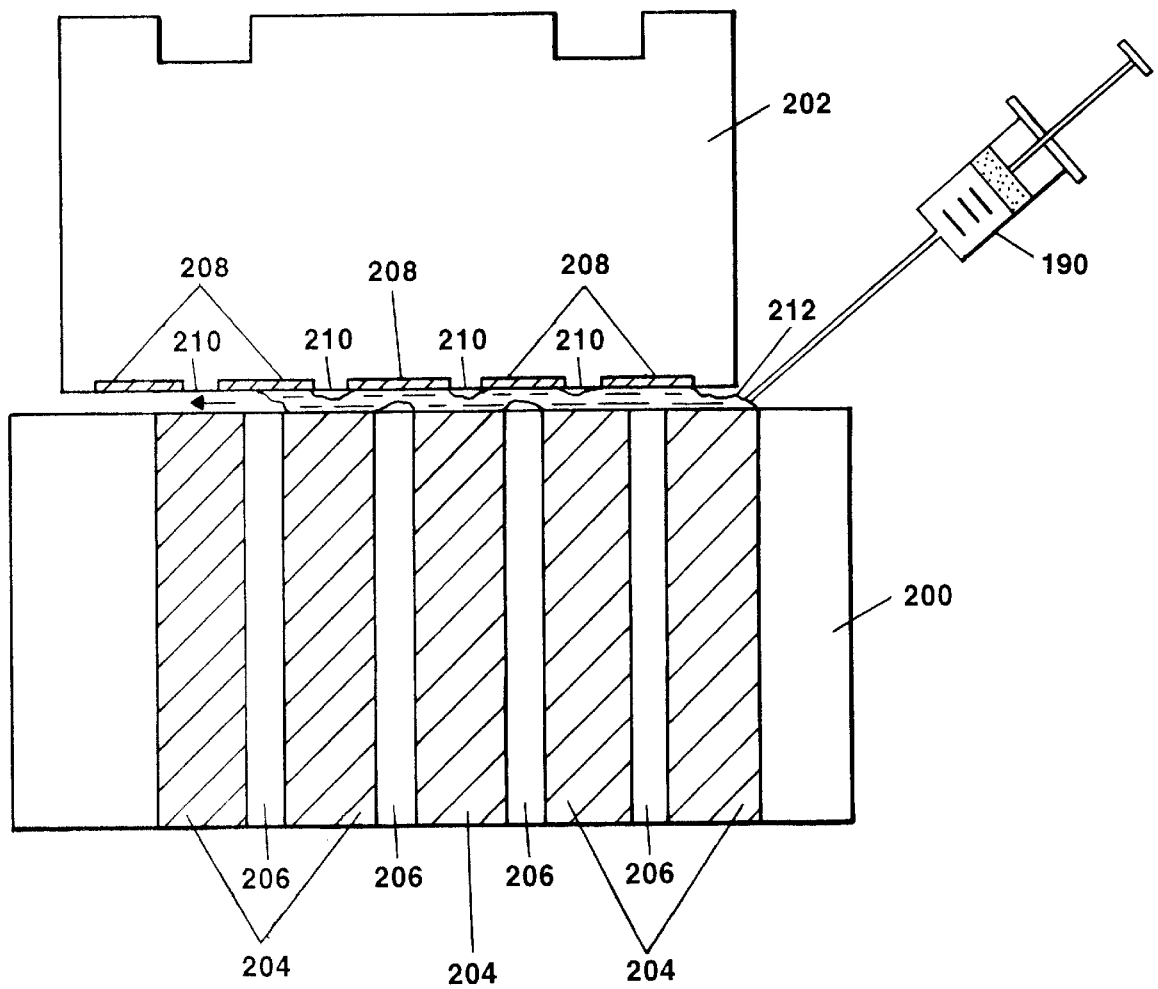
FIG. 9(b) is a partial cross-sectional view of the embodiment of FIG. 9(a) which the shaft displaced axially relative to the stator.

Once the shaft 200 is appropriately displaced relative to the stator 202, syringe 190, which has been filled with the desired sealing liquid 212, is used to inject the liquid 212 into the gap between the shaft 200 and the stator 202. Since the wettable surfaces 204, 108 overlap each other axially, the liquid is drawn from one wettable surface to another, alternating between the shaft wettable surfaces 204 and the stator wettable surfaces 208. The injection of liquid 212 is shown in FIG. 9(b), as is its tendency to flow from one wettable surface to the next. The affinity of the liquid for the wettable surfaces 204, 208 results in the liquid being transported from one stage of the liquid seal to the next in the direction of the arrow shown in FIG. 9(b), until liquid is present at each of the wettable surfaces 204, 208.

Figure 9C:
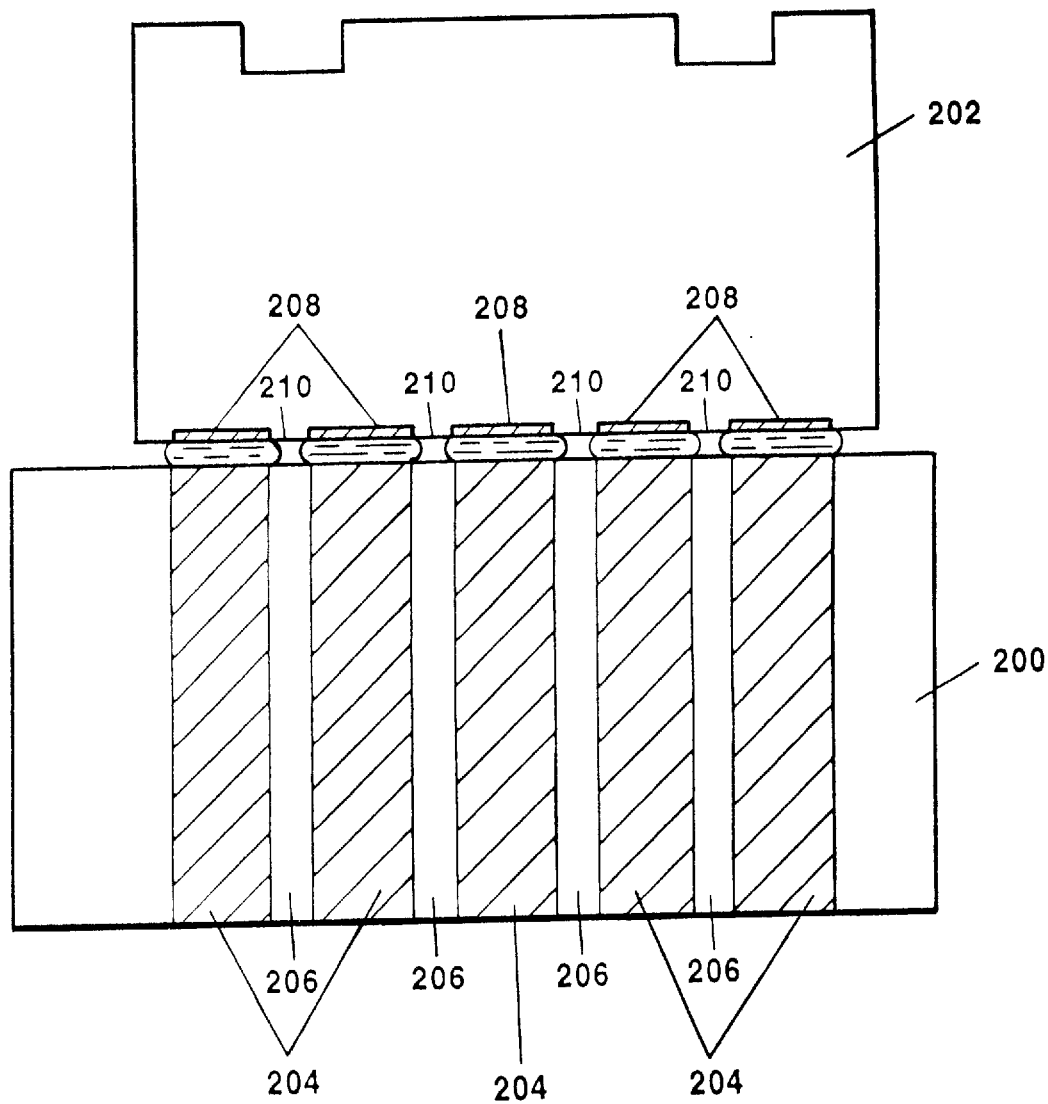
FIG. 9(c) is a partial cross-sectional view of the embodiment of FIG. 9(a) with a sealing liquid in place.

Once the seal has been filled with liquid, the shaft 200 and the stator 202 are returned to the axial position in which the wettable surfaces 204 of the shaft are axially aligned with the wettable surfaces 208 of the stator 208. This positioning is depicted in FIG. 9(c). As shown, the liquid wets surfaces 204, 208, gathering in the gaps between wettable surfaces 204, 208, while avoiding contact with non-wettable surfaces 206, 210. The proximity of the shaft 200 to the stator 202 is close enough that the liquid is held in these gaps, forming annular liquid sealing rings held in place by the surface tension of the liquid 212. A meniscus may form along the edges of the each liquid ring, as the surface tension of the liquid holds the rings in place.

The multiple stages of the liquid seal allow for good vacuum sealing along the length of the shaft, each stage providing an additional degree of pressure retention. While five stages of the seal are shown in FIGS. 9(a)–9(c), those skilled in the art will recognize that the seal may be any number of stages, as appropriate for a particular application.

Figure 10:
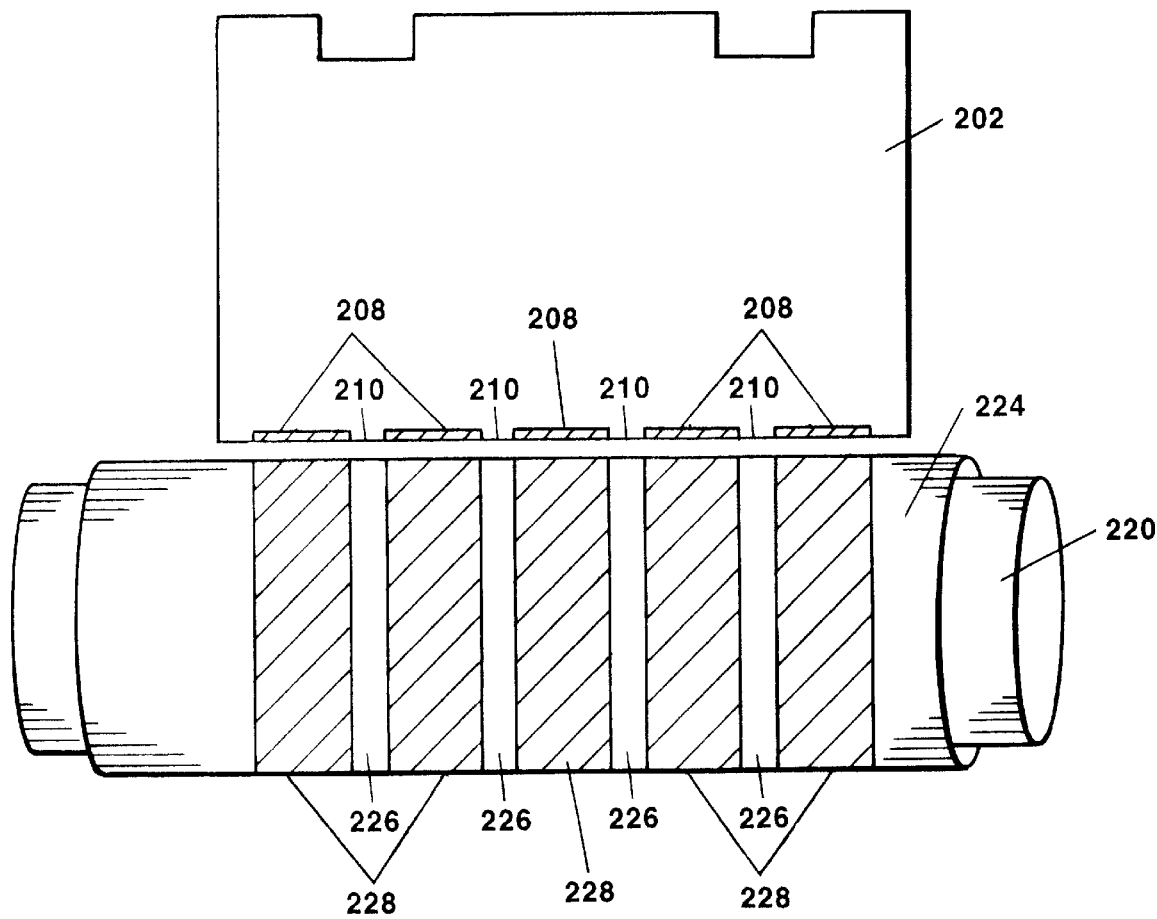
FIG. 10 is a partial cross-sectional view of a multi-stage capillary seal in which the shaft is mounted in a sleeve.

Shown in FIG. 10 is an alternative to the embodiment of FIGS. 9(a)–9(c). The liquid sealing apparatus of FIG. 10 is very similar to that of FIGS. 9(a)–9(c), except that the shaft 220 is mounted in a sleeve 224 which rotates with the shaft. A static seal, such as an O-ring, maintains the airtight sealing along the axial length of the shaft. The sleeve has wettable surface regions 228 and non-wettable surface regions 226 in the same distribution as the surface of the shaft 200 of FIGS. 9(a)–9(c). The stator 202 encompasses the sleeve 224 in the same manner that it encompasses the shaft 200 in the embodiment of FIGS. 9(a)–9(c). The filling of the seal with liquid is done in essentially the same manner as shown for the seal of FIG. 9(b). However, since the wettable and non-wettable surfaces 226, 228 are located on the sleeve 224 instead of the shaft 20, filling of the seal requires only that the sleeve is displaced relative to stator 202 and not the shaft. This is particularly beneficial in situations where the shaft position may be fixed relative to the stator, or where the size of the shaft makes it particularly difficult to move.

It should be understood that the foregoing description is intended to illustrate rather than limit the invention. Modifications and additions to the disclosed embodiments will be recognized by those skilled in the art which do not depart from the scope of the invention, as defined by the claims.

What is claimed is:

1. An on-site fillable liquid sealing apparatus for forming a hermetic seal around a rotatable shaft with a predetermined sealing liquid, the seal comprising:

a stator surrounding the shaft;

sealing means for retaining the liquid in a plurality of discrete annular regions between the shaft and the stator along an axial length of the shaft when the shaft is in an undisplaced position, and for forming a path of reduced flow resistance between the shaft and the stator along the axial length of the shaft when the shaft is axially displaced a predetermined distance relative to the stator to a displaced position;

means for axially displacing the shaft said predetermined distance relative to the stator; and a liquid injector for introducing the sealing liquid between the shaft and the stator such that the liquid flows along said path of reduced flow resistance.

2. A sealing apparatus according to claim 1 wherein the sealing means comprises a plurality of substantially annular, highly wettable shaft surfaces axially spaced along an outer surface of the shaft.

3. A sealing apparatus according to claim 2 wherein the sealing means further comprises a plurality of substantially annular, non-wettable shaft surfaces interspersed with the wettable shaft surfaces in an alternating manner along the outer surface of the shaft.

4. A sealing apparatus according to claim 2 wherein the sealing means further comprises a plurality of substantially annular, highly wettable stator surfaces axially spaced along an inner surface of the stator and located such that the wettable stator surfaces are axially aligned with the wettable shaft surfaces when the shaft is in the undisplaced position.

5. A sealing apparatus according to claim 4 wherein an axial width of the wettable shaft surfaces is substantially equal to an axial width of the wettable stator surfaces.

6. A sealing apparatus according to claim 4 wherein, when the shaft is in the displaced position, each wettable shaft surface has a predetermined axial position, and each wettable stator surface has a predetermined axial position, and the axial positions of the wettable shaft surfaces overlap with the axial positions of the wettable stator surfaces such as to form said path of reduced flow resistance from an alternating sequence of overlapping wettable shaft surfaces and wettable stator surfaces.

7. A sealing apparatus according to claim 4 wherein the sealing means further comprises a plurality of substantially annular, non-wettable stator surfaces interspersed with the wettable stator surfaces in an alternating manner along the inner surface of the stator and located such that the non-wettable stator surfaces are axially aligned with the non-wettable shaft surfaces when the shaft is in the undisplaced position.

8. A sealing apparatus according to claim 7 wherein an axial width of the non-wettable shaft surfaces is substantially equal to an axial width of the non-wettable stator surfaces.

9. A sealing apparatus according to claim 7 wherein an axial width of the wettable shaft surfaces is greater than an axial width of the non-wettable stator surfaces, and an axial width of the wettable stator surfaces is greater than an axial width of the non-wettable shaft surfaces.

10. A sealing apparatus according to claim 7 wherein the predetermined sealing liquid comprises Gallium.

11. A sealing apparatus according to claim 10 wherein the non-wettable shaft surfaces comprise Alumina, Boron Nitride, Silicon Nitride or Titanium Dioxide.

12. A sealing apparatus according to claim 2 wherein the predetermined sealing liquid comprises Gallium.

13. A sealing apparatus according to claim 12 wherein the wettable shaft surface comprises Tungsten, Molybdenum, Niobium or Tantalum.

14. A sealing apparatus according to claim 12 wherein the non-wettable shaft surface comprises Alumina, Boron Nitride, Silicon Nitride or Titanium Dioxide.

15. An on-site fillable liquid sealing apparatus for forming a hermetic seal around a rotatable shaft with a predetermined sealing liquid, the seal comprising:

a stator surrounding the shaft and having an inner diameter larger than the outer diameter of the shaft;

a plurality of substantially annular, highly wettable shaft surfaces axially spaced along an outer surface of the shaft;

a plurality of substantially annular, highly wettable stator surfaces axially spaced along an inner surface of the stator and located such that the wettable stator surfaces are axially aligned with the wettable shaft surfaces when the shaft is in an undisplaced position;

a plurality of substantially annular, non-wettable shaft surfaces interspersed with the wettable shaft surfaces in an alternating manner along the outer surface of the shaft;

a plurality of substantially annular, non-wettable stator surfaces interspersed with the wettable stator surfaces in an alternating manner along the inner surface of the stator;

means for axially displacing the shaft said predetermined distance relative to the stator to a displaced position in which each wettable shaft surface has a predetermined axial position and each wettable stator surface has a predetermined axial position, and the axial positions of the wettable shaft surfaces overlap with the axial positions of the wettable stator surfaces such as to form a path of reduced flow resistance from an alternating sequence of axially overlapping wettable shaft surfaces and wettable stator surfaces; and a liquid injector for introducing the sealing liquid between the shaft and the stator such that the liquid flows along said path of reduced flow resistance.

16. A sealing apparatus according to claim 15 wherein an axial width of the wettable shaft surfaces is greater than an axial width of the non-wettable stator surfaces, and an axial width of the wettable stator surfaces is greater than an axial width of the non-wettable shaft surfaces.

17. A sealing apparatus according to claim 15 wherein the predetermined sealing liquid comprises Gallium.

18. A sealing apparatus according to claim 17 wherein the non-wettable shaft surfaces comprise Alumina, Boron Nitride, Silicon Nitride or Titanium Dioxide.

19. A sealing apparatus according to claim 17 wherein the wettable shaft surface comprises Tungsten, Molybdenum, Niobium or Tantalum.

20. A method for filling a liquid seal with a predetermined sealing liquid to form multiple seals around a rotatable shaft surrounded by a stator, the liquid being retained in a plurality of discrete annular regions between the shaft and the stator along an axial length of the shaft when the shaft is in an undisplaced position, said discrete annular regions being defined by shaft regions and stator regions that are axially aligned when the shaft is in said undisplaced position, the method comprising:

displacing the shaft a predetermined distance relative to the stator to a displaced position, said displacing of the shaft forming a path of reduced flow resistance between the shaft and the stator from a first shaft region to an adjacent shaft region along the axial length of the shaft;

applying the sealing liquid to an end of the seal such that the liquid flows along said path of reduced flow resistance between the shaft and the stator from the first shaft region to the second shaft region; and returning the shaft to the undisplaced position.

* * * * *